United States Patent
Morgan (10) Patent No.: US 6,267,550 B1
(45) Date of Patent: Jul. 31, 2001

(54) CONTAINER NESTING AND COUNTING APPARATUS

(75) Inventor: Mark J. Morgan, Menomonee Falls, WI (US)

(73) Assignee: Paper Machinery Corporation, Milwaukee, WI (US)

( * ) Notice: Subject to any disclaimer, the term of this patent is extended or adjusted under 35 U.S.C. 154(b) by 0 days.

(21) Appl. No.: 09/649,334

(22) Filed: Aug. 28, 2000

(51) Int. Cl.[7] .................................................. B65G 57/16
(52) U.S. Cl. ................................... 414/798.4; 198/419.1; 414/801
(58) Field of Search ...................... 198/419.1; 414/798.4, 414/790.3, 801, 802

(56) References Cited

U.S. PATENT DOCUMENTS

| | | |
|---|---|---|
| 3,827,582 * | 8/1974 | Lederer .......................... 198/419.1 X |
| 4,042,124 | 8/1977 | Bowdry, III et al. . |
| 4,132,320 | 1/1979 | Cournoyer et al. . |
| 4,269,557 | 5/1981 | Kidd . |
| 4,545,714 | 10/1985 | Johnson et al. . |
| 4,712,361 | 12/1987 | Oberol .................................. 53/540 |
| 4,865,515 | 9/1989 | Dorner et al. .................... 414/788.2 |
| 4,921,088 * | 5/1990 | Ter Horst ...................... 198/419.1 X |
| 5,122,029 | 6/1992 | DelDuca ............................ 414/789.2 |
| 5,192,181 | 3/1993 | Bryde-Hansen .................. 414/795.3 |
| 5,273,167 | 12/1993 | Haas et al. ............................ 209/591 |

FOREIGN PATENT DOCUMENTS

7903253 * 10/1980 (NL) .................................. 198/419.1

* cited by examiner

Primary Examiner—Janice L. Krizek
(74) Attorney, Agent, or Firm—Foley & Lardner (57) ABSTRACT

A method and apparatus for nesting a plurality of containers into a stack having a desired quantity of containers are disclosed. The apparatus includes a container guide, a container hold back, a counter and a shuttle. The container guide includes an input end and output end and provides at least one guide surface adapted to direct the plurality of containers from the input end to the output end. The container hold back is proximate the output end and includes a stop surface actuatable between a first hold back position in which the stop surface engages a frontward most container of the plurality of containers such that successive containers nest within the frontward most container and within each other and a second retracted position. The counter is proximate the input end and is configured to count the plurality of containers moving towards the output end prior to the containers nesting with each other. The shuttle is situated proximate the guide and is configured to engage and push a counted and nested stack of containers toward the output end past the hold back based upon the number of nested containers that have moved past the counter. The method includes the steps of directing a plurality of containers including a first container and a last container in succession, reducing a rate of movement of the first container at a first downstream location causing successive containers to nest with the first container and to nest with one another, counting each of the plurality of containers to produce a container count as the containers move past a second upstream location prior to becoming nested with preceding containers and engaging the last container and pushing the last container and the plurality of containers past the first downstream location in response to the container count equaling a predetermined quantity.

27 Claims, 6 Drawing Sheets

CONTAINER NESTING AND COUNTING APPARATUS

FIELD OF THE INVENTION

The present invention relates to machines or assemblies for counting and stacking nestable containers. In particular, the present invention relates to an apparatus that accurately and reliably counts nesting containers in a continuous fashion.

BACKGROUND OF THE INVENTION

Containers are used for containing and storing a wide variety of products. In most cases, such containers are manufactured at a site different from the site where the container is actually filled with the product. In many circumstances, the containers are manufactured, boxed, sold and delivered to a distinct purchaser which fills the containers. To facilitate the packaging and transport of the finished containers, such containers are often nested within one another. At the same time, the containers must be arranged and counted for invoicing and for inventory management. Although the process of nesting and counting such containers has been automated with a variety of different apparatuses, such known apparatuses are prone to undesirable stoppages and provide inaccurate and unreliable container counts.

Thus, there is a continuing need for a machine or apparatus that accurately and precisely nests and counts containers in a continuous and efficient manner.

SUMMARY OF THE INVENTION

One embodiment of the present invention relates to an apparatus for nesting a plurality of containers into a stack having a desired quantity of containers are disclosed. The apparatus includes a container guide, a container hold back, a counter and a shuttle. The container guide includes an input end and output end and provides at least one guide surface adapted to direct the plurality of containers from the input end to the output end. The container hold back is proximate the output end and includes a stop surface actuatable between a first hold back position in which the stop surface engages a frontward most container of the plurality of containers such that successive containers nest within the frontward most container and within each other and a second retracted position. The counter is proximate the input end and is configured to count the plurality of containers moving towards the output end prior to the containers nesting with each other. The shuttle is situated proximate the guide and is configured to engage and push a counted and nested stack of containers toward the output end past the hold back based upon the number of nested containers that have moved past the counter.

Another embodiment of the present invention relates to a method for nesting a plurality of containers into a stack having a desired quantity of containers. The method includes the steps of directing a plurality of containers including a first container and a last container in succession, reducing a rate of movement of the first container at a first downstream location causing successive containers to nest with the first container and to nest with one another, counting each of the plurality of containers to produce a container count as the containers move past a second upstream location prior to becoming nested with preceding containers and engaging the last container and pushing the last container and the plurality of containers past the first downstream location in response to the container count equaling a predetermined quantity.

DETAILED DESCRIPTION OF THE PREFERRED EMBODIMENTS

Figure 1:
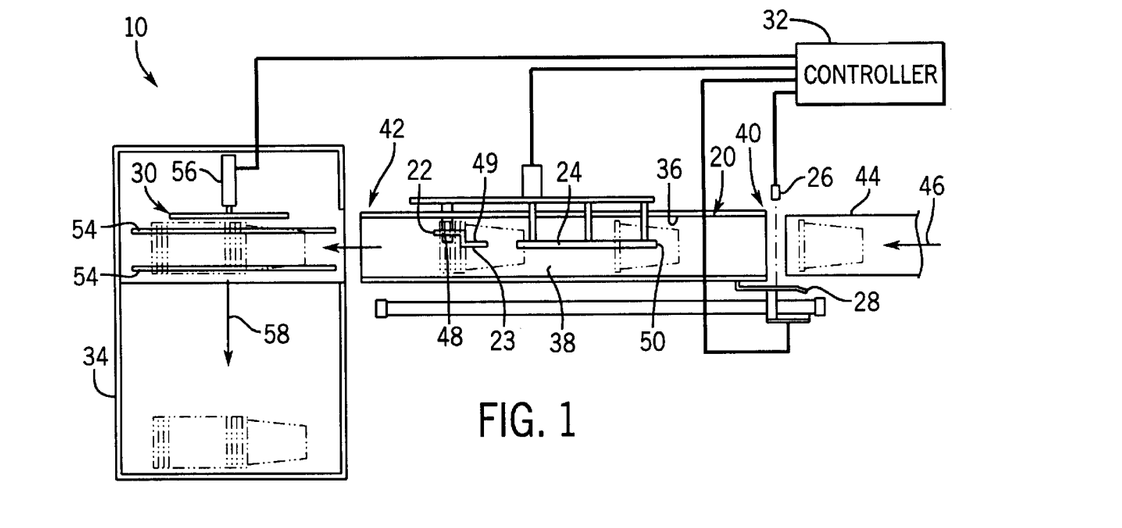
FIG. 1 is a schematic illustration of an exemplary embodiment of a container nesting and counting apparatus of the present invention.
Figure 2:
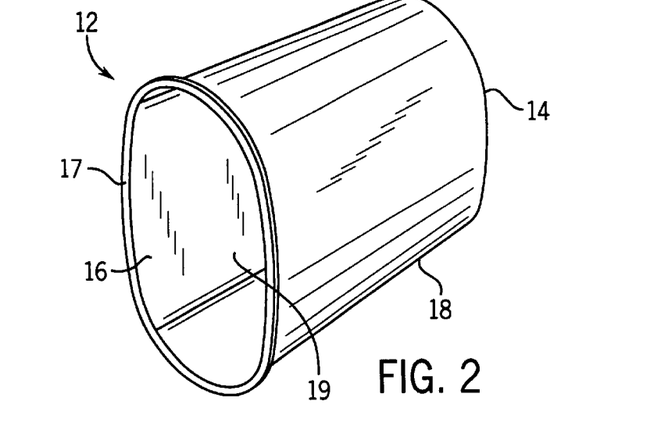
FIG. 2 is a perspective view of an exemplary container which may be nested and counted by the apparatus of FIG. 1.

FIG. 1 is a schematic illustration of container nesting and counting apparatus 10 adapted to nest and count container 12 shown in FIG. 2. Container 12 generally includes a closed end 14, an open end 16, and at least one sidewall 18 defining an interior 19. Although apparatus 10 is especially suited for nesting and counting non-round containers such as container 12, apparatus may also be used for nesting and counting round containers as well.

Apparatus 10 generally includes container guide 20, container hold back 22, tail lifter 23, container brake 24, counter 26, shuttle 28, kickoff assembly 30, controller 32 and receiving tray 34. Container guide 20 provides at least one guide surface 36 adapted to continuously or intermittently engage containers 12 so as to direct containers 12 along a container channel or passageway 38 from an input end 40 to an output end 42. Input end 40 is positioned proximate a source 44 of manufactured containers 12 which directs manufactured containers 12 into passage 38 of guide 20 as indicated by arrow 46 with an initial velocity towards output end 42 and container hold back 22.

Container hold back 22 is positioned proximate output end 42 and includes a stop surface 48 actuatable between a hold back position and a retracted position. In the hold back position, surface 48 engages a frontward most of the plurality of containers 12 being directed through guide 20 to stop movement of the frontward most container 12. As a result, successive containers 12 nest with the frontward most container and with each other. In particular, the internal volume or interior 19 of each container 12, except for the frontward most container 12, receives the closed end 14 and at least one sidewall 18 of a preceding container 12. When stop surface 48 is in the retracted position, nesting containers 12 may be moved past containers hold back 22 into kickoff assembly 30 and receiving tray 34.

Tail lifter 23 is positioned between container hold back 22 and input end 40 proximate to hold back 22. Tail lifter 23 includes a lift surface 49 which extends into engagement with sidewall 18 of container 12. Lift surface 49 lifts the sides of sidewall 18 of containers 12 to elevate closed end 14 to facilitate nesting of containers 12. Lift surface 49 of tail lifter 23 is especially advantageous when apparatus 10 is nesting and counting containers with tapering sidewalls such as container 12.

Prior to being stopped by container hold back 22, containers 12 are braked by container brake 24. Container brake 24 is located between input end 40 and output end 42 and between input end 40 and container hold back 22. Container brake 24 includes at least one braking surface 50 adapted to contact containers 12 and allow continued movement of containers 12 towards output end 42 and towards container hold back 22 while braking containers 12 to slow the movement of containers 12 from the initial velocity to a reduced velocity. In the exemplary embodiment, once container brake 24 has sufficiently braked the movement of containers 12, container brake 24 also urges containers 12 towards container hold back 22 to insure complete and compact nesting of containers 12.

Counter 26, shuttle 28 and controller 32 cooperate to count and eject a predetermined number of nested containers 12 past output end 42 of container guide 20 to kickoff assembly 30. Counter 26 counts the number of containers 12 transferred past input end 40 into passage 38 prior to containers 12 becoming nested with one another. Counter 26 generates signals representing the number of containers 12 moving past it and transmits those signals to controller 32 for control of shuttle 28. In the exemplary embodiment, counter 26 comprises a conventionally known photo eye positioned proximate to input end 40. Counter 26 may alternatively comprise other sensing devices configured to sense or count movement of containers 12 past a preselected point. Counter 26 may also be positioned in a variety of alternative locations so long as counter 26 is able to count containers 12 prior to containers 12 becoming nested with one another.

Shuttle 28 extends adjacent to guide 20 and is configured to engage and push a counted and nested stack of containers 12 towards output end 42 and past container hold back 22 based upon the number of containers 12 that have moved past counter 26 as sensed by counter 26. Shuttle 28 is electronically coupled to controller 32 so as to receive control signals from controller 32. In response to such control signals, shuttle 28 actuates between a starting position proximate input end 40 and a finishing position proximate output end 42. Although less desirable, shuttle 28 may alternatively be directly coupled to counter 26 and be configured to actuate between the starting position and the finishing position in direct response to signals from counter 26.

Once shuttle 28 has been actuated to the finishing position so as to engage and push a counted and nested stack of containers 12 past output end 42 of guide 20 into kickoff assembly 30, kickoff assembly 30 ejects the stack of containers 12 into receiving tray 34 for packaging or transport to another processing station. Kickoff assembly 30 generally includes container guides 54 and ejector 56. Kickoff guides 54 engage the stacked and nested containers 12 while guiding their movement from output end 42 to a position adjacent to ejector 56. Ejector 56 is positioned proximate to kickoff guide 54 and is actuatable between a loading position and an ejecting position. When ejector 56 is in the loading position, stacked and nested containers 12 are loaded adjacent to ejector 56. During actuation to the ejecting position, ejector 56 engages the stacked series of containers 12 and ejects the stacked series of containers 12 from guides 54 into a holding area such as receiving tray 34 as indicated by arrow 58. In the exemplary embodiment, ejector 56 is actuated between the loading position and the ejecting position in response to control signals from controller 32. Alternatively, ejector 56 may actuate between the loading position and the ejecting position in response to manual input from an operator or in response to other sensing devices such as in response to the sensed presence of containers 12 adjacent to ejector 56.

Controller 32 is electrically coupled to counter 26, shuttle 28, container brake 24 and ejector 56. Controller 32 generates control signals which control the speed at which container brake 24 urges containers 12 towards hold back 22. Controller 32 also generates control signals which control the timing and rate at which ejector 56 ejects containers 12. Lastly, controller 32 receives signals from counter 26 and, based upon such signals, generates control signals which control the timing at which shuttle 28 actuates between the starting position and the finishing position to move the nesting containers past hold back 22 and past output end 42. In an alternative embodiment, controller 32 is also configured to control the speed at which shuttle 28 actuates between the starting position and the finishing position. In the exemplary embodiment, controller 32 comprises a conventionally known programmed logic controller including conventionally known control circuits configured to perform such tasks. Alternatively, controller 32 may comprise other control devices such as computer hardware, computer software and the like. In addition, controller 32 may alternatively be configured to control greater or fewer components of apparatus 10.

Figure 3:
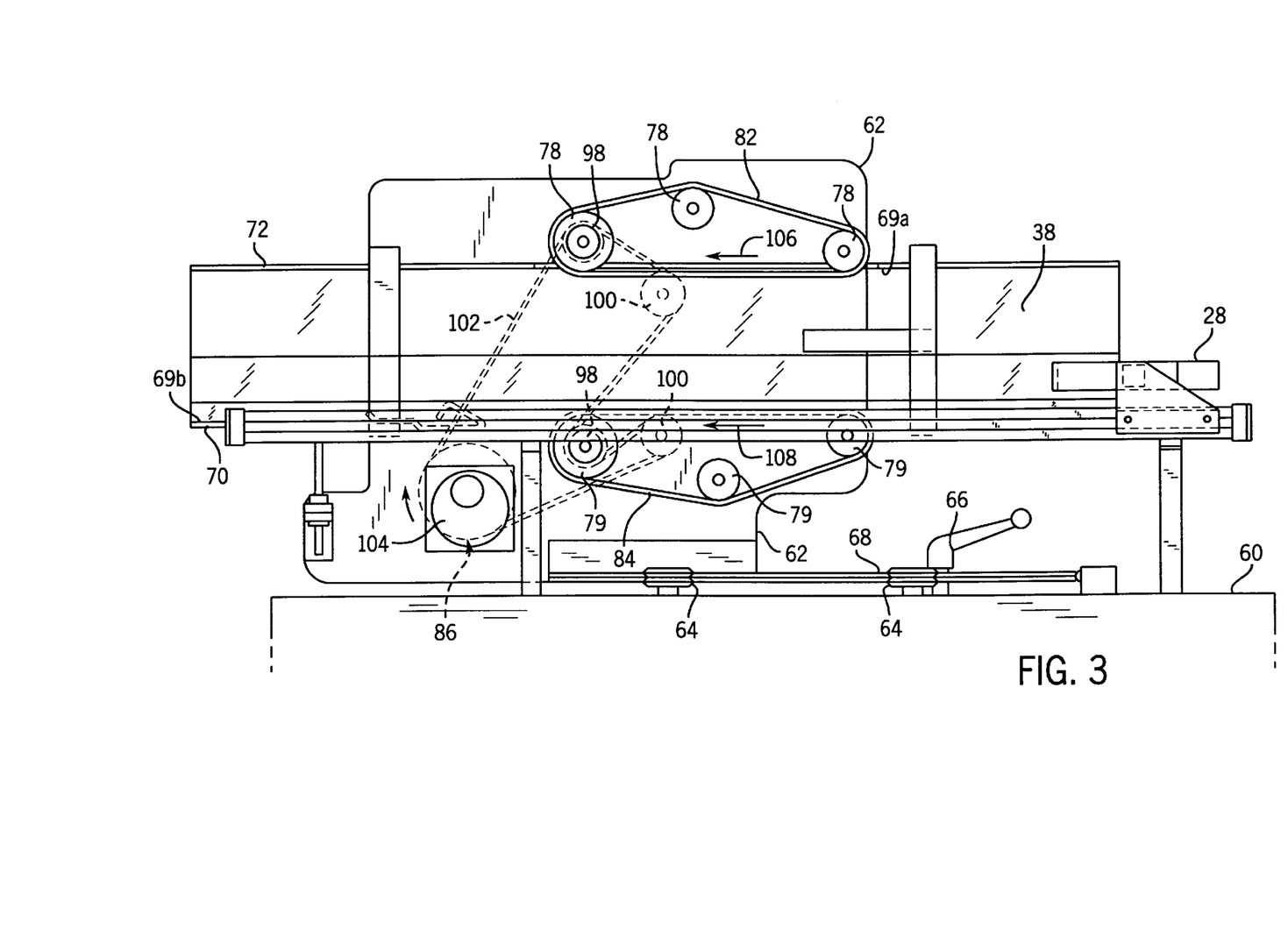
FIG. 3 is a side elevational view of a portion of the apparatus.
Figure 4:
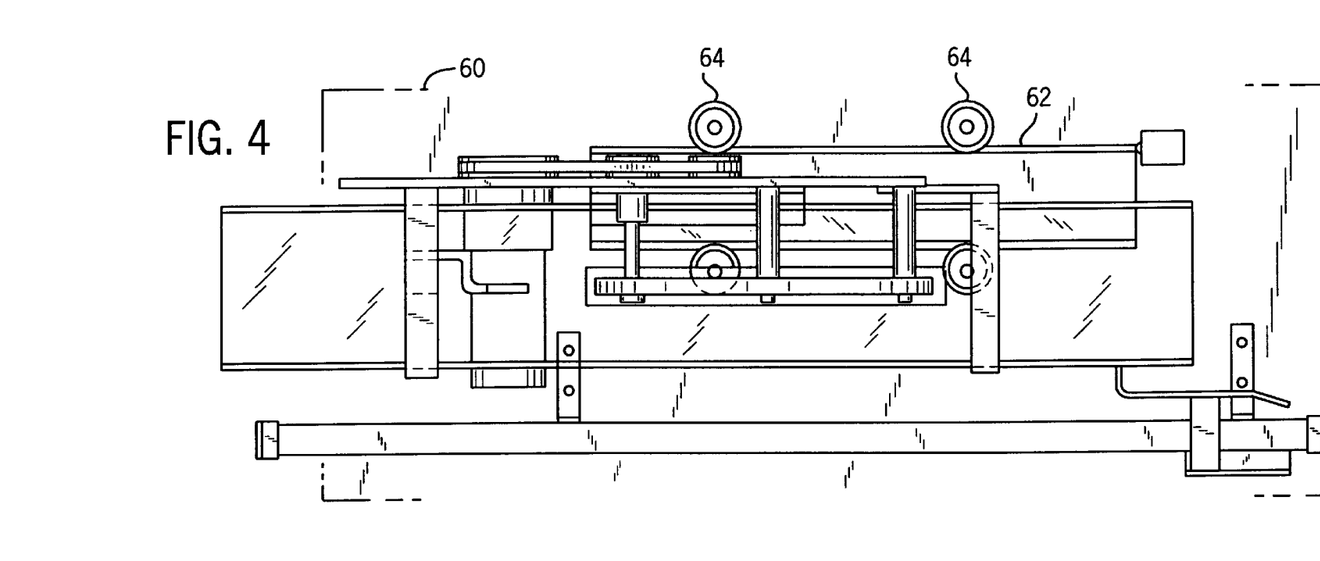
FIG. 4. is the top elevational view of the apparatus of FIG. 3.
Figure 5:
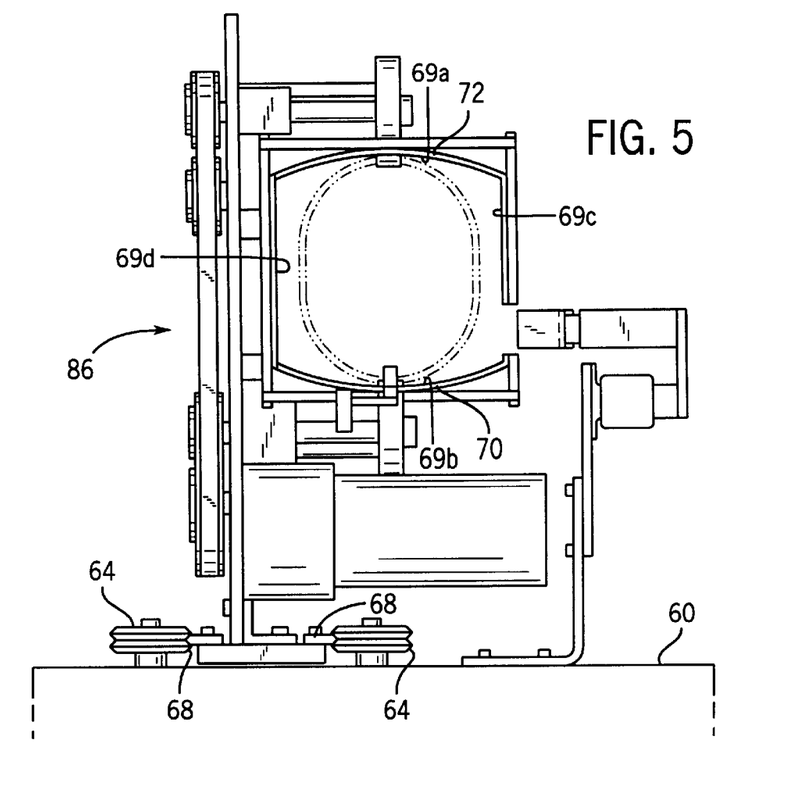
FIG. 5 is a left end elevational view of the apparatus of FIG. 3.

FIGS. 3–11 illustrate apparatus 10 in greater detail. As best shown by FIGS. 3, 4 and 5, apparatus 10 additionally includes base 60 and frame 62. Base 60 supports frame 62 and the remaining components of apparatus 10. Base 60 further supports shuttle 28 adjacent to frame 62. In the exemplary embodiment, base 60 cooperates with frame 62 to movably support frame 62 to provide adjustability. Base 60 preferably includes guide rollers 64 and clamp 66. Guide rollers 64 rollably support frame 62 along rails 68 of frame 62. As a result, frame 62 may be moved to adjust the relative position of frame 62 relative to shuttle 28 and container source 44. Clamp 66 comprises a conventionally known clamped position proximate to rail 68. Upon being rotated, clamp 66 engages an opposite side of rail 68 and presses rail 68 towards guide roller 64 to clamp rail 68 in place in a desired position relative to shuttle 28 and source 44. Although less desirable, frame 62 may alternatively be fixedly secured to base 60 or may be movably supported relative to base 60 by various other adjustable supporting mechanisms.

Frame 62 comprises a base structure for supporting container guide 20, container hold back 22 and container brake 24. Frame 62 is movably supported relative to base 60 by a pair of rails 68 received within guide rollers 64.

As best shown by FIGS. 3 and 5, guide surfaces 36 of container guide 20 include an upper most guide surface 69*a* and a lower most guide surface 69*b* provided by a lower guide plate 70 and upper guide plate 72, respectively. In the exemplary embodiment, guide surfaces 36 also include opposing side guide surfaces 69*c* and 69*d* also provided by plates 70 and 72. Guide plates 70 and 72 extend opposite one another so as to engage opposite sides of walls 18 of containers 12. In the exemplary embodiment, guide plates 70 and 72 are elongate arcuate plates which form a substantially enclosed passageway 38. Plates 70 and 72 are preferably adjustable to accommodate differently sized containers 12. Plates 70 and 72 are preferably formed from a plastic material, such as LEXAN and are preferably transparent so as to allow visual inspection of containers 12 as containers 12 pass along passageway 38. Because passage 38 is substantially enclosed, containers 12 more easily move along passage 38 under the initial force of air pressure created by the jets (not shown) of source 44 which blow containers 12 past counter 26 and into container guide 20 as indicated by arrow 46 in FIG. 1. Although less desirable, container guide 20 may alternatively be provided by a plurality of adjustably positioned rods or bars which extend into engagement with the perimeter portions of containers 12 and which provide upper most and lower most guide surfaces 36.

FIGS. 3–5 and 6 best illustrate container brake 24. Container brake 24 generally includes upper and lower belt pulleys 78, 79 upper brake belt 82, lower brake belt 84 and drive assembly 86. Upper and lower belt pulleys 78, 79 are rotatably supported by frame 62 above and below passage 38 and are configured to support belts 82 and 84 adjacent to opposite sides of passage 38. In the exemplary embodiment, apparatus 10 includes three upper pulleys 78 and three lower pulleys 79. At least one of pulleys 78 and pulley 79 are operably coupled to drive assembly 86.

Figure 6:
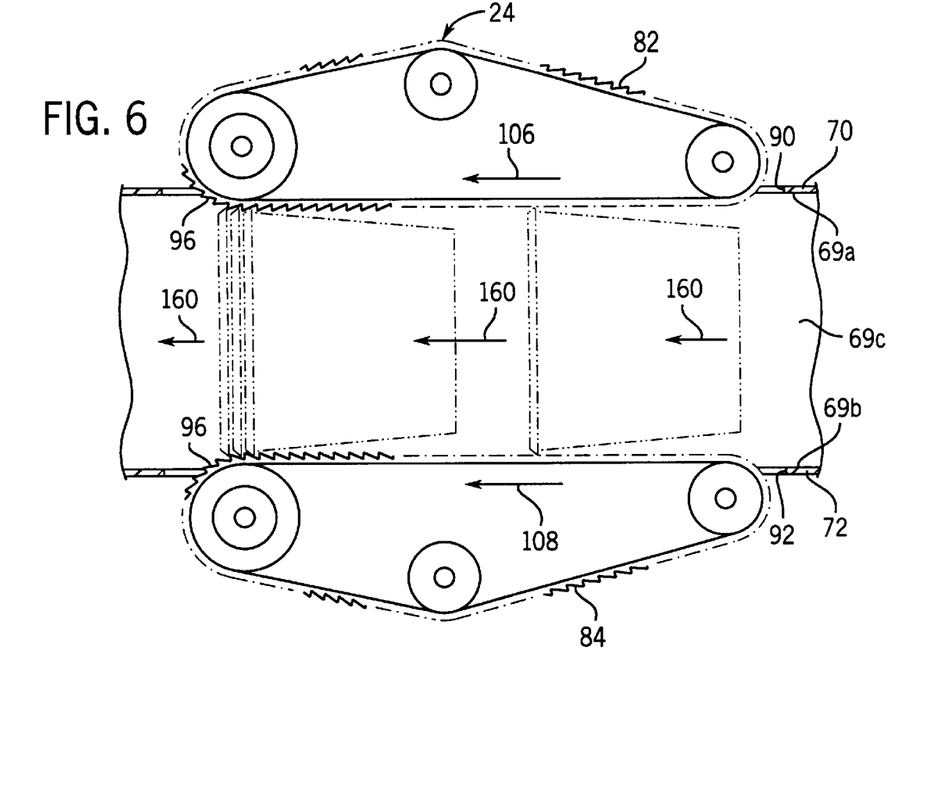
FIG. 6 is an enlarged fragmentary sectional view of the apparatus of FIG. 3. illustrating containers moving past a container break of the apparatus.

Upper belt 82 and lower belt 84 extend about upper pulleys 78 and lower pulleys 79, respectively, and are rotatably driven by drive assembly 86. As best shown by FIG. 6, upper belt 82 is preferably supported by upper pulleys 78 so as to extend through an opening 90 within upper guide plate 70 and so as to extend below the upper most guide surface 69a of plate 70 into engagement with sidewalls 18 and rims 17 of containers 12. Similarly, lower belt 84 is supported by lower pulleys 79 so as to extend through opening 92 in lower plate 72 above the lower most guide surface 69b provided by lower plate 70 so as to engage sidewalls 18 and rims 17 of containers 12. In particular, each of upper belt 82 and lower belt 84 are preferably spaced apart from one another so as to slightly engage and brake the movement of containers 12 while still permitting the continued movement of containers 12 towards output end 42. As further shown by FIG. 6, upper brake 82 and lower brake belts 84 are preferably provided with teeth 96 which face output end 42. As a result, teeth 96 cause containers 12 to ratchet between upper belt 82 and lower belt 84 towards output end 42 during braking. Teeth 96 further enable belts 82 and 84 to catch rims 17 of containers 12 as belts 82, 84 are driven by drive assembly 86.

As best shown by FIG. 3, drive assembly 86 generally includes drive pulleys 98, idler pulleys 100, drive belt 102 and motor assembly 104. Drive pulleys 98 are coaxially fixed to one of upper pulleys and one of lower pulleys 79. Idler pulleys 100 comprise conventionally known idler pulleys rotatably supported by frame 62 so as to maintain drive belt 102 in tension. Drive belt 102 is driven by motor assembly 104 and extends about drive pulleys and idler pulleys 100. Motor assembly 104 comprises a conventionally known motor assembly having one or more gear reducers coupled to drive belt 102. Motor assembly 104 drives drive belt 102 which in turn drives drive pulleys 98 to drive upper belt 82 and lower belt 84 in the directions indicated by arrows 106 and 108, respectively. In lieu of utilizing a belt and pulley system, drive assembly 86 may alternatively utilize chains and sprockets, gear trains or other drive mechanisms configured for being driven by motor assembly 104. In lieu of utilizing a single motor assembly 104 to drive both upper belt 82 and lower belt 84, apparatus 10 may alternatively utilize a separate motor and drive assembly for each of upper belt 82 and lower belt 84.

Overall, container brake 24 brakes the movement of containers 12 from container source 44 to a controlled speed to prevent containers 12 from axially moving past container hold back 22. At the same time, container brake 24 moves and urges any stopped containers 12 further towards container hold back 22 to insure that containers 12 are completely nested within one another for compact packaging or transport. Container brake 24 also allows shuttle 28 to engage and push containers through passage 38 past braking belts 82, 84 at a rate faster than the movement of braking belts 82 and 84 and past hold back 22 when a preselected number of containers 12 have passed counter 26.

Although less desirable, container brake 24 may have many other variations. For example, in lieu of having a pair of oppositely positioned belts 82, 84, brake 24 may alternatively utilize a single braking belt or greater than two braking belts. In lieu of extending both above and below containers 12 moving along passage 38, braking belts 82, 84 may extend along left and right sides of such containers. In lieu of having teeth, braking belts 82, 84 may omit such teeth and may be flat so as to rely on friction to brake containers 12. In lieu of continually moving and urging containers 12 towards hold back 22, belts 82, 84 of container brake 24 may alternatively be stationary, yet configured to brake the movement of containers 12 while allowing containers 12 to continue to move at a reduced rate until engaging container hold back 22.

Figure 7:
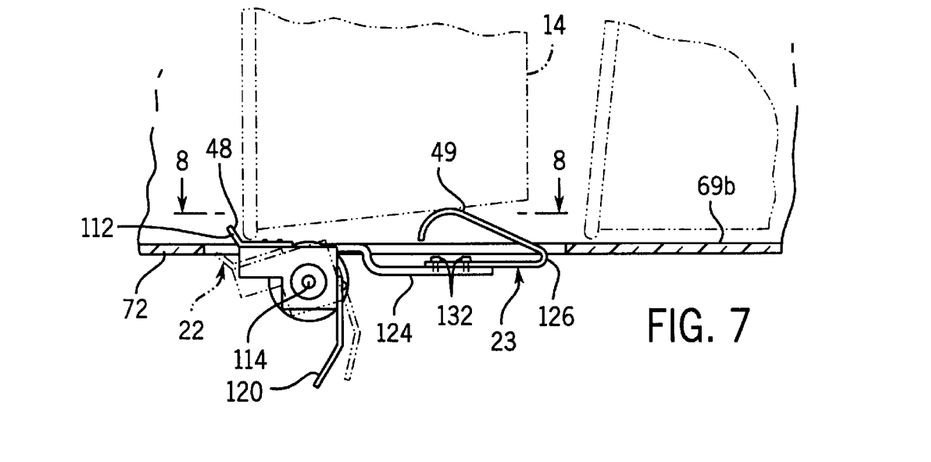
FIG. 7 is an enlarged fragmentary sectional view of the apparatus of FIG. 3 illustrating the containers adjacent the container hold back and the tail lifter of the apparatus.
Figure 8:
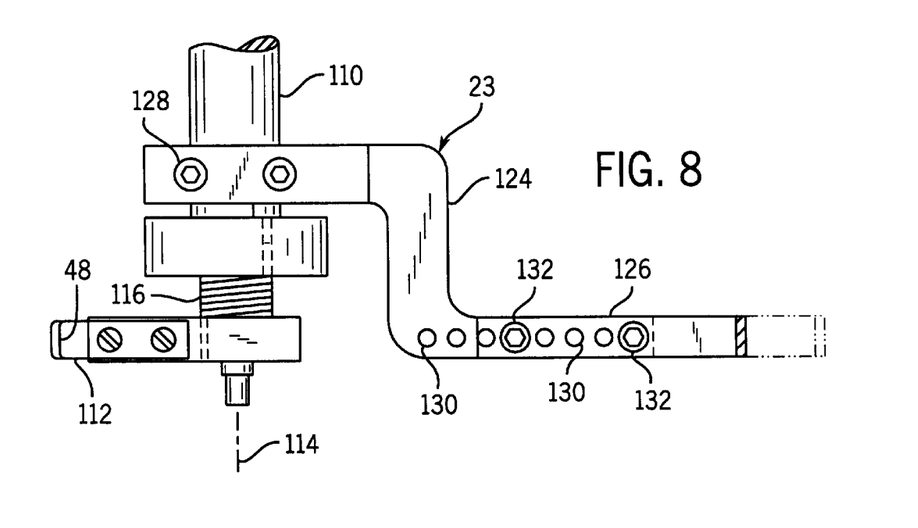
FIG. 8 is a sectional view of the apparatus of FIG. 7 taken along lines 8—8.

FIGS. 7 and 8 illustrate container hold back 22 and tail lifter 23 in greater detail. As best shown by FIG. 7, container hold back 22 includes the stop surface 48 which projects above the lower most guide surface 69b provided by lower plate 72 of guide 20. Stop surface 48 catches or engages rim 17 of a frontward most container 12 to prevent further movement of the frontward most container 12 past stop surface 48. As a result, successive containers 12 are further stopped by stop surface 48 and nest together with the frontward most container until shuttle 28 engages and pushes a series of nested containers 12 to kickoff assembly 30 or until a sufficient number of containers 12 has nested between stop surface 48 and braking belts 82 and 84 such that belts 82 and 84 drive containers 12 past surface 48 of hold back 22. In the exemplary embodiment, stop surface 48 is provided by an arm 112 which is pivotally supported about axis 114 for rotation between the hold back position (shown in solid lines) and the retracted position (shown in phantom). As best shown by FIG. 8, arm 112 is resiliently biased to the hold back position by a spring 116. Spring 116 preferably has an adjustable spring force sufficient so as to maintain arm 112 and stop surface 48 in the hold back position as containers 12 are urged against stop surface 48. However, spring 116 preferably has a predetermined spring force that allows arm 112 and stop surface 48 to pivot against the biasing force of spring 116 to the retracted position as containers 12 are pushed against stop surface 48 by shuttle 28 or by braking belts 82 and 84. To facilitate manual actuation of arm 112 of stop surface 48 to the retracted position for manual unloading of containers 12, container hold back 22 additionally includes an optional retraction arm 120 coupled to arm 112 on an opposite side of axis 114. Pivotal movement of arm 120 about axis 114 pivots arm 112 to the retracted position as shown in FIG. 7.

Although less desirable, container hold back 22 may have a variety of other alternative configurations and may be actuated between the hold back position and the retracted position by various other means. For example, in lieu of pivoting between the hold back position and the retracted position, stop surface 48 may alternatively reciprocate horizontally or vertically between the two positions, wherein stop surface 48 is resiliently biased towards the hold back position by a spring, a resilient living hinge or other conventionally known resilient biasing structures. In lieu of being resiliently biased to the hold back position wherein stop surface 48 is actuated to the retracted position under the force of containers 12 being pushed by shuttle 28 or belts 82, 84, stop surface 48 may alternatively be actuated both to the hold back position and to the retracted position by rotary, linear, pneumatic, hydraulic, electric or mechanical actuators which are under the control of controller 32 or a separate controller so as to actuate surface 48 to the retracted position prior to or as shuttle 28 or belts 82, 84 are pushing containers 12 towards output end 42.

As further shown by FIGS. 7 and 8, tail lifter 23 generally includes support arm 124 and lift arm 126. Support arm 124 extends from support shaft 110 of frame 62 towards input end 40 (shown in FIG. 1). Support arm 124 is preferably secured to support shaft 110 in an adjustable fashion for rotational repositioning of support arm 124 about axis 114 to vary the extent at which tail lifting surface lifts containers 12. In the exemplary embodiment, support arm 124 is angularly secured to shaft 110 by bolts 128. Removable bolts 128 enables support arm 124 to be rotated about axis 114, wherein refastening of bolts 128 secures support arm 124 in place in a desired position.

Lift arm 126 is a generally V-shaped member extending from support arm 124 towards input end 40 (shown in FIG. 1) below plate 72 and extending towards output end 42 above plate 72 and the lower most guide surface provided by plate 72. Lift arm 126 provides lift surface 49 which extends above lower most guide surface 69b provided by plate 72 to engage a side of containers 12 to elevate the side of containers 12 above the lower most guide surface 69b. As shown by FIG. 7, tail lifter 23 engages each of the sides of containers 12 to lift the sides of containers 12 such that closed end 14 is also lifted above lower guide surface 69b so as to easily nest within interior 19 of the next succeeding container 12 without catching upon rim 17 of the succeeding container 12. Tail lifter 23 is especially advantageous when apparatus 10 is nesting and counting containers having tapering sidewalls such as container 12.

As best shown by FIG. 8, lift arm 126 is preferably adjustably supported relative to support arm 124 such that the tail lifting surface 49 may be selectively repositioned between a plurality of positions differently spaced from stop surface 48 of container hold back 22 to accommodate different containers having different angles of taper or having different heights or distances between closed end 14 and open end 16. In the exemplary embodiment, support arm 124 and lift arm 126 each include the plurality of apertures 130 that enable lift arm 126 to be mounted to support arm 124 at a plurality of locations by aligning different apertures 130 with one another and by securing arm 126 to arm 124 in a desired location with the insertion of bolts 132 through the aligned apertures 130. As will be appreciated, various other mechanisms may be provided for enabling tail lifting surface 49 to be supported at a plurality of positions relative to stop surface 48. For example, lift arm 126 may alternatively be telescopically adjustable relative to itself or support arm 124, may be slidably adjustable or may include multiple segments releasably mountable to one another in an end-to-end overlapping fashion to extend the length of either support arm 124 or lift arm 126.

Figure 9:
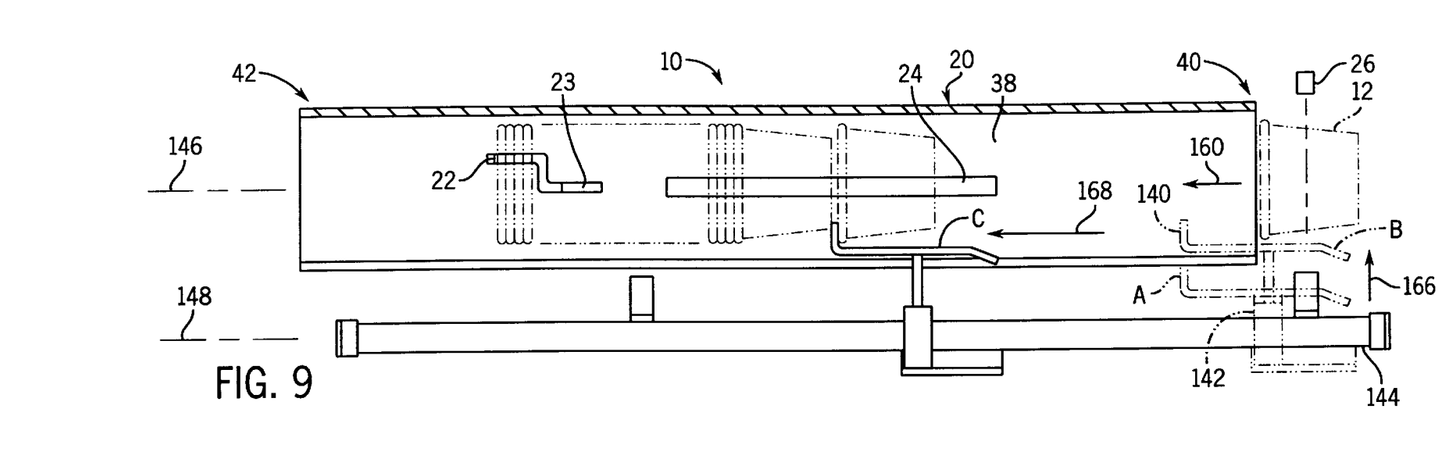
FIGS. 9 and 10 are schematic sectional views of the apparatus of FIG. 1 illustrating actuation of a shuttle to move containers through the apparatus.
Figure 10:
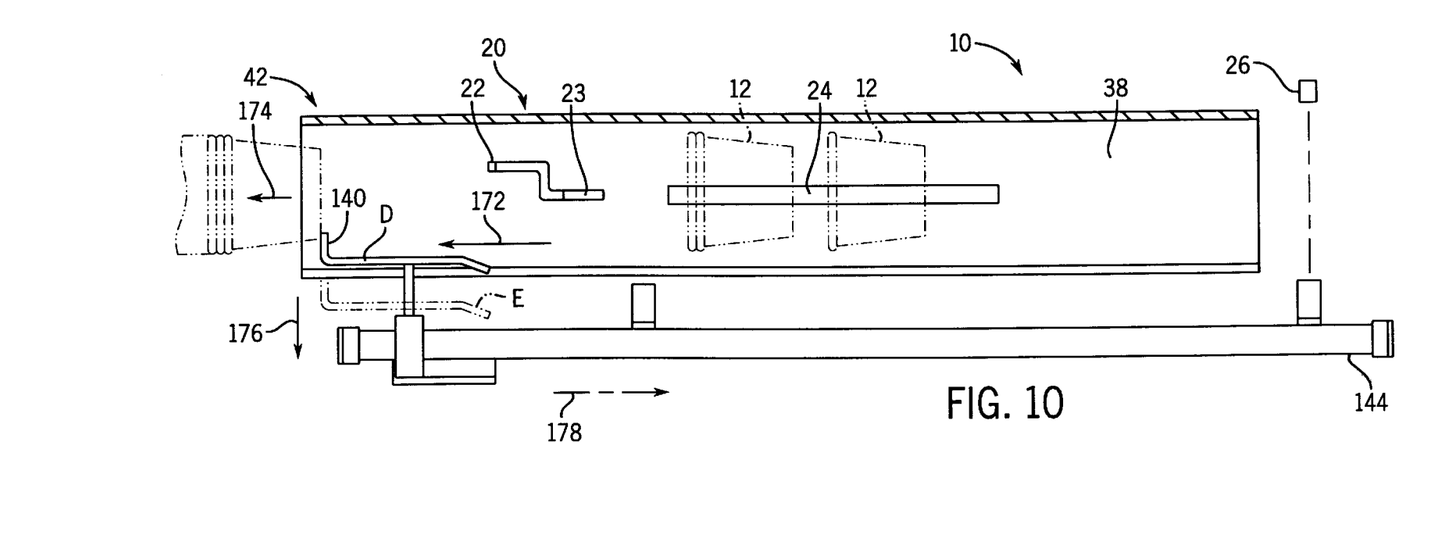

FIGS. 9 and 10 illustrate shuttle 28 in greater detail. As discussed above with respect to FIG. 1, shuttle 28 engages and pushes a counted and nested stack of containers towards output end 42 past hold back 22 based upon the number of nested containers 12 that have moved past counter 26 as sensed by counter 26. Shuttle 28 generally includes interrupter bar 140, interrupter actuator 142 and reciprocating actuator 144. Interrupter bar 140 comprises an elongate member actuatable in a direction perpendicular to axis 146 of passage 38 between a container engaging position shown in solid in FIG. 9 and a container disengaging position shown in phantom in FIG. 10. In the container engaging position, bar 140 extends between successive containers 12 to prevent contact between the successive containers 12 and to prevent nesting of the containers 12. In the container disengaging position, bar 140 is sufficiently withdrawn from passage 38 to allow the successive containers to continue moving towards output end 42 until becoming nested. Interrupter bar 140 is coupled to interrupter actuator 142.

Interrupter actuator 142 is coupled to interrupter bar 140 and is, itself, coupled to reciprocating actuator 144 for reciprocating movement between input end 40 and output end 42. Interrupter actuator 142 actuates bar 140 between the container engaging position and the container disengaging position. In the exemplary embodiment, container actuator 142 comprises a conventionally known pneumatic actuator such as a cylinder piston assembly. Alternatively, reciprocating actuator 142 may comprise other well-known actuators such as hydraulic, cylinder-piston assembly actuators, electrically driven actuators such as electrically driven solenoids or mechanically driven reciprocating actuators such as those using cam and cam follower arrangements. In the exemplary embodiment, interrupter actuator 142 actuates bar 140 between the container engaging position and the container disengaging position in response to control signals from controller 32 (shown in FIG. 1).

Reciprocating actuator 144 is coupled to interrupting actuator 142 and is configured to move interrupting actuator 142 and bar 140 between input end 40 and output end 42 along axis 148. In particular, actuator 144 carries or moves interrupter actuator 142 and interrupter bar 140 from input end 40 to output end 42 when interrupter bar 140 is in the container engaging position. Actuator 144 carries or moves interrupter actuator 142 and interrupter bar 140 from output end 42 to input end 40 when interrupter bar 140 is in the container disengaging position. In the exemplary embodiment, reciprocating actuator 144 comprises a conventionally known pneumatic actuator such as a conventionally known pneumatic rodless cylinder. Alternatively, actuator 144 may comprise other well-known actuators or mechanisms for reciprocating along an axis such as hydraulic actuators including pneumatic or hydraulic cylinder-piston assemblies, electrically driven actuators including electrically driven solenoids or mechanical actuators such as those using cam and cam follower arrangements or such as those using endless chains or belts which allow reciprocating movement back and forth along an axis. Reciprocating actuator 144 preferably reciprocates between input end 40 and output end 42 in response to control signals from controller 32 (shown in FIG. 1).

Figure 11:
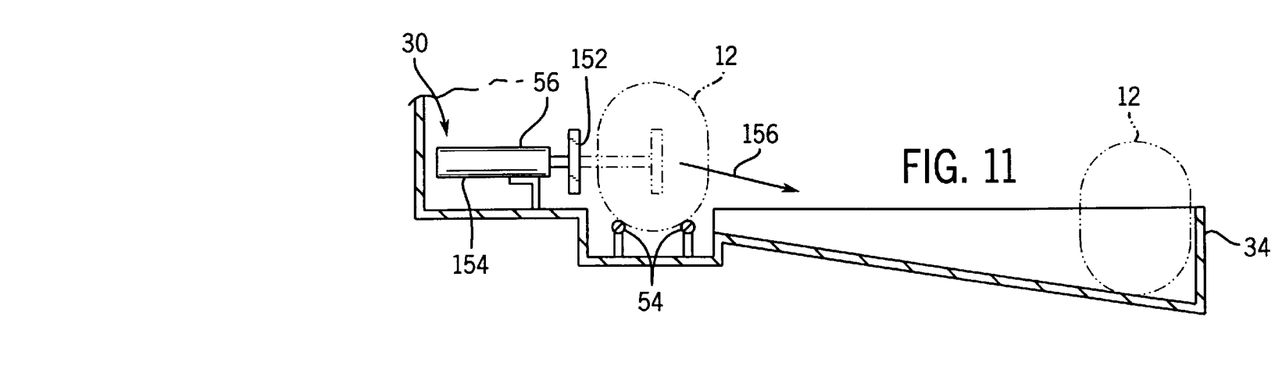
FIG. 11 is a sectional view of the apparatus of FIG. 1 illustrating a kick off assembly in a receiving tray of the apparatus.

FIG. 11 illustrates kick off assembly and receiving tray 34 in greater detail. As best shown by FIG. 11, guides 54 of kick off assembly 30 consist of a pair of spaced rods or bars which serve as tracks for guiding movement of nested stack of containers 12 to a position between ejector 56 and receiving tray 34. Ejector 56 generally includes a push bar 152 and an actuator 154. Actuator 154 actuates push bar 152 between the positions shown in solid and the position shown in phantom, whereby push bar 152 engages and pushes sides of containers 12 in a direction substantially perpendicular to the axis of guides 54 so as to eject containers 12 from guides 54 in the direction indicated by arrow 156 into receiving tray 34. After the nested stacks of containers 12 have been ejected into receiving tray 34, guides 54 are now empty and ready to receive the next stack of nested containers 12.

In the exemplary embodiment, actuator 154 comprises a conventionally known pneumatic cylinder-piston assembly. Alternatively, actuator 154 may comprise other well-known reciprocating actuators such as hydraulic cylinder-piston assemblies, electrically driven actuators such as electrically driven solenoids or mechanically driven actuators such as cam and cam follower arrangements and the like. Actuator 154 preferably actuates push bar 152 in response to control signals received from controller 32 (shown in FIG. 1). As discussed above, actuator 154 may alternatively actuate push bar 152 in response to other control signals. For example, actuator 154 may actuate push bar 152 in response to signals from sensors to sense the presence of a nested and stacked containers 12 on guides 54 or in response to other signals which would otherwise indicate or correspond to the time at which containers 12 are positioned upon guides 54 and ready for ejection into receiving tray 34.

A more detailed description of the counting and nesting of containers 12 by apparatus 10 follows. After the containers 12 are made, containers 12 are moved past counter 26 (shown in FIGS. 1, 9 and 10) preferably under the force of pneumatic jets. Counter 26 counts the number of containers passing by it and generates signals which are sent to controller 32 indicating the number of containers 12 that have passed counter 26. Once counted, containers 12 continue moving towards output end 42 in the direction indicated by arrow 160 (shown in FIG. 9). As shown by FIG. 6, containers 12 continue moving in the direction indicated by arrows 160 past braking belts 82, 84 of container brake 24. As containers 12 move between braking belts 82 and 84, braking belts 82 and 84 frictionally engage opposite sides of containers 12 to slow the movement of containers 12 in the direction indicated by arrow 160. Because belts 82 and 84 preferably include teeth facing output end 42, containers 12 ratchet forward in a direction indicated by arrow 160 towards output end 42. Depending upon the velocity of containers 12, containers 12 may pass completely through belts 82 and 84 and continue moving towards output end 42 until reaching stop surface 48 of container hold back 22 shown in FIG. 7. The tail ends and closed ends 14 of such containers 12 are lifted by tail lifting surface 49 of tail lifter 23. After a sufficient number of containers 12 have nested within one another, the tail ends or closed ends 14 of the rearward most containers 12 of the nested stack of containers 12 will inherently be raised above the lower most guide surface 69b without the need of support from tail lifter 23. For those containers 12 which do not pass completely through and between braking belts 82 and 84 or which do not become completely nested with preceding containers, braking belts 82 and 84 drive or urge such containers towards output end 42 so as to completely nest with preceding containers 12.

Upon receiving an appropriate signal from counter 26 and upon determining that a preselected desired number of containers 12 have past counter 26, controller 32 (shown in FIG. 1) causes interrupting actuator 142 to actuate interrupter bar 140 from a container disengaging position proximate input end 40 (position A in FIG. 9) in the direction indicated by arrow 166 to a container engaging position proximate input end 40 (identified with reference B in FIG. 9). After actuator 142 is actuated, to move bar 140 to the container engaging position B shown in FIG. 9, controller 32 generates a control signal which causes reciprocating actuator 144 to move bar 140 towards output end 42 in the direction indicated by arrow 168. During such movement of interrupter bar 140 towards output end 42 by actuator 144, interrupter bar 140 engages the rearward most container 12 and accelerates the movement and velocity of the rearward most container 12 and all preceding containers 12 such that all containers 12 between interrupter bar 140 and hold back 22 become compactly nested. Continued movement of interrupter bar 140 towards output end 42 by actuator 144 causes a frontward most container 12 between interrupter bar 140 and output end 42 to forcefully pivot hold back 22 in a counterclockwise direction as shown in FIG. 7 to the retracted position. As shown by FIG. 10, reciprocating actuator 144 continues to move interrupter bar 140 towards output end 42 in the direction indicated by arrow 172 until reaching the complete eject position D at which point the nested stack of containers 12 have been moved in the direction indicated by arrow 174 on to guides 54 (shown in FIG. 11). The nested stack of containers 12 is then ejected into receiving tray 34 by kick off assembly 30 shown in FIG. 11.

Once the counted and nested stack of containers 12 have been pushed out of container guide 20 on to kick off assembly 30 (shown in FIG. 11), controller 32 generates control signals which cause interrupting actuator 142 to actuate interrupting bar 140 from the container engaging position D proximate output end 42 to a container disengaging position E in the direction indicated by arrow 176 proximate output end 42. After interrupter bar 140 has been moved to position E, controller 32 generates a control signal which causes reciprocating actuator 144 to move interrupting actuator 142 and interrupting bar 140 in the direction indicated by arrow 178 from output end 42 to input end 40 and back to container disengaging position A (shown in FIG. 9), whereby interrupter bar 140 is ready for the next successive stack of nested and counted containers.

As further shown by FIGS. 9 and 10, as interrupter bar 140 moves from the container engaging position B adjacent input end 40 to a container engaging position D adjacent output end 42, containers 12 continue to be fed into apparatus 10 past counter 26 between bar 140 and input end 40. Reciprocating actuator 144 preferably moves interrupter bar 140 at a rate sufficient such that interrupter bar 140 does not stop the progression of containers 12 towards output end 42 prior to containers 12 reaching braking belts 82, 84. Upon reaching braking belts 82, 84, containers 12 are further urged towards container hold back 22. As a result, apparatus 10 counts and nests containers 12 in a continuous, uninterrupted fashion, whereby containers 12 may be continuously fed from source 44.

Although interrupter bar 140 is configured to simultaneously perform two functions: (1) the separation of a rearward most container of a preceding counted stack of containers and a frontward most container of a succeeding to be counted stack of containers and (2) the movement of the preceding counted stack of nested containers past hold back 22 to kick off assembly 30, such functions may be performed by separate bars or other members. For example, apparatus 10 may alternatively be configured to include a first bar which simply reciprocates between a container engaging position and a container disengaging position to interrupt and separate the rearward most and frontward most containers of successive container stacks and may also be provided with a separate bar or other conveying mechanism that conveys the preceding counted stack of containers past hold back 22 and past output end 42.

Apparatus 10 further enables a nested series or stack of containers 12 larger than the distance between input end 40 and container holder back 22 by allowing the series or stack of the nested containers to extend beyond hold back 22. In particular, when the number of containers 12 within the stack of nested containers is large enough such that the frontward most container 12 is positioned against hold back 22 and the current rearward most container 12 of the stack is compactly nested and lies against braking belts 82 and 84, braking belts 82 and 84 will continue to urge the nested stack of containers 12 so as to overcome the biasing force of spring 116 and so as to pivot hold back 22 to the retracted position, allowing the stack of containers 12 to slowly move past hold back 22 towards output end 42. At the same time, however, the inertia of the stacked containers 12 allows additional containers 12 to continue to nest with the rearward most container 12 of the stack of containers 12 until the stack of containers 12 reaches a desired number of containers 12. Once the stack of containers 12 reaches the desired number, as sensed by counter 26, shuttle 28 ejects or pushes the entire stack of nested containers 12 past output end 42 to kick off assembly 30.

Overall, the above-described apparatus 10 accurately and precisely nests and counts round and non-round containers in a continuous and efficient manner. Apparatus 10 also is adjustable to accommodate containers of different sizes and configurations. The number of containers per stack is adjustable using controller 32. Because shuttle 28 interrupts the series of containers 12 prior to containers 12 nesting with one another and after the containers 12 have been counted by counter 26, shuttle 28 projects into a naturally occurring gap when in the container engaging position. As a result, apparatus 10 more reliably counts the stacks of a predetermined number of containers 12. Braking belts 82, 84 assist the movement of containers 12 from input end 40 to output end 42 to thereby eliminate the need for intermediate jets. Hold back 22 enables a nested series of containers 12 larger than the distance between hold back 22 and input end 40 by allowing the series or stack of nested containers 12 to extend beyond hold back 22. Braking belts 82, 84 insure compact nesting for containers 12. Tail lifter 23 further insures correct nesting of containers 12 having tapered sidewalls.

Although the present invention has been described with reference to preferred embodiments, workers skilled in the art will recognize that changes may be made in form and detail without departing from the spirit and scope of the invention. Because the technology of the present invention is relatively complex, not all changes in the technology are foreseeable. The present invention described with reference to the preferred embodiments and set forth in the following claims is manifestly intended to be as broad as possible. For example, unless specifically otherwise noted, the claims reciting a single particular element also encompass a plurality of such particular elements.

What is claimed is:

1. An apparatus for nesting a plurality of moving containers into a stack and for controlling the number of nested containers in the stack, the apparatus comprising:

a container guide including an input end and an output end, the container guide providing at least one guide surface adapted to direct the plurality of containers from the input end to the output end;

a container hold-back proximate to the output end, the hold-back including a stop surface actuatable between a first hold-back position in which the stop surface engages a frontward most container of the plurality of containers such that successive containers nest with the frontward most container and with each other and a second retracted position;

a counter proximate the input end and configured to count the plurality of containers moving towards the output end prior to the containers nesting with each other; and a shuttle adjacent the guide, the shuttle being configured to engage and push a counted and nested stack of containers towards the output end past the hold-back based upon the number of nested containers that have moved past the counter as sensed by the counter.

2. The apparatus of claim 1, wherein the counter generates a signal representing the number of containers passing the counter and wherein the shuttle actuates between a starting position proximate the input end and a finishing position proximate the output end in response to the signal.

3. The apparatus of claim 1, wherein the hold-back pivots between the hold-back position and the retracted position.

4. The apparatus of claim 1, wherein the hold-back is resiliently biased towards the hold-back position.

5. The apparatus of claim 1, wherein the guide includes first and second opposite guide surfaces adapted to extend along first and second opposite sides of the plurality of containers.

6. The apparatus of claim 1, including:

a base; and a frame movably coupled to the base between a plurality of positions, the frame supporting the container guide and the hold-back.

7. The apparatus of claim 1, including a controller coupled to the counter and the shuttle, wherein the controller is configured to generate a control signal based upon a predetermined number of containers for a stack and signals from the counter representing the actual number of containers that have passed the counter, and wherein the shuttle reciprocates along the container guide based upon the control signal.

8. The apparatus of claim 1, including a receiving tray adjacent the output end.

9. The apparatus of claim 8, including a kick-off assembly proximate the receiving tray and configured to engage and push against sides of the nested stack of containers.

10. The apparatus of claim 1, wherein said at least one guide surface contacts a side of the containers.

11. The apparatus of claim 10, wherein the guide has a tubular cross-sectional shape.

12. The apparatus of claim 1, wherein the guide includes a lowermost guide surface adapted to guide sides of the plurality of containers and wherein the apparatus includes a tail-lifting surface adapted to extend above the lowermost guide surface to engage a side of one of the plurality of containers to elevate the side of the container above the lowermost guide surface.

13. The apparatus of claim 12, wherein the tail-lifting surface is selectively repositionable between a plurality of positions differently spaced from the hold-back.

14. The apparatus of claim 12, wherein the tail-lifting surface is repositionable between a plurality of positions differently spaced above the lowermost guide surface.

15. The apparatus of claim 1, wherein the guide extends along an axis and wherein the shuttle actuates in a direction perpendicular to the axis between a container engaging position and a container disengaging position, wherein the shuttle moves in a direction along the axis towards the output end when in the engaging position to move the nested stack of containers towards the output end and wherein the shuttle moves in a direction along the axis towards the input end when in the disengaging position to return for another nested stack of containers.

16. The apparatus of claim 15, wherein the shuttle includes:
   a bar;
   an interrupting actuator coupled to the bar and configured to actuate the bar between the container engaging position and the disengaging position; and
   a reciprocating actuator coupled to the interrupting actuator and the bar and configured to move the interrupting actuator and the bar between the output end and the input end.

17. The apparatus of claim 16, wherein the interrupting actuator and the reciprocating actuator comprise pneumatic actuators.

18. The apparatus of claim 1 including a container brake between the input end and the output end, the brake having at least one braking surface adapted to contact the containers and to allow continued movement of the containers towards the output end while braking the containers.

19. The apparatus of claim 7 including a container brake between the input end and the output end, the brake having at least one braking surface adapted to contact the containers and to allow continued movement of the containers towards the output end while braking the containers, wherein the brake includes:
   a belt; and
   a motor coupled to the belt and the controller, wherein the motor drives the belt in response to the control signal.

20. The apparatus of claim 18, wherein the braking surface moves towards the output end while braking the containers.

21. The apparatus of claim 20, wherein the braking surface is provided by a belt.

22. The apparatus of claim 21, wherein the belt has teeth facing the output end.

23. The apparatus of claim 18, wherein the brake includes first and second braking surfaces adapted to engage first and second sides of at least one of the plurality of containers.

24. The apparatus of claim 23, wherein the brake includes first and second belts providing the first and second braking surfaces, respectively.

25. The apparatus of claim 24, wherein the first and second belts move the first and second braking surfaces towards the output end.

26. An apparatus for nesting a plurality of moving containers into a stack and for controlling the number of nested containers in the stack, the apparatus comprising:
   container guide means for guiding and directing the plurality of containers from an input end to an output end;
   container hold-back means for selectively engaging a frontward most container of the plurality of containers such that successive containers nest within the frontward most container and within each other;
   counter means for counting the plurality of containers moving towards the output end prior to the containers nesting with each other; and
   shuttle means for engaging and pushing a nested stack of containers towards the output end past the hold back means based upon the number of nested containers that have moved past the counter means as sensed by the counter means.

27. A method for nesting a plurality of containers into a stack having a desired quantity of containers, the method comprising:
   directing a plurality of containers in succession, the plurality of containers including a first container and a last container;
   reducing a rate of movement of the first container at a first downstream location causing successive containers to nest within the first container and to nest within one another;
   counting each of the plurality of containers to produce a container count as the containers move past a second upstream location prior to becoming nested with preceding containers; and
   engaging the last container and pushing the last container and the plurality of containers past the first downstream location in response to the container count equaling a pre-determined quantity.

* * * * *